June 8, 1965   B. D. ALM   3,187,384
CURING TUBES FOR VULCANIZING APPARATUS
Filed Nov. 17, 1961   2 Sheets-Sheet 2

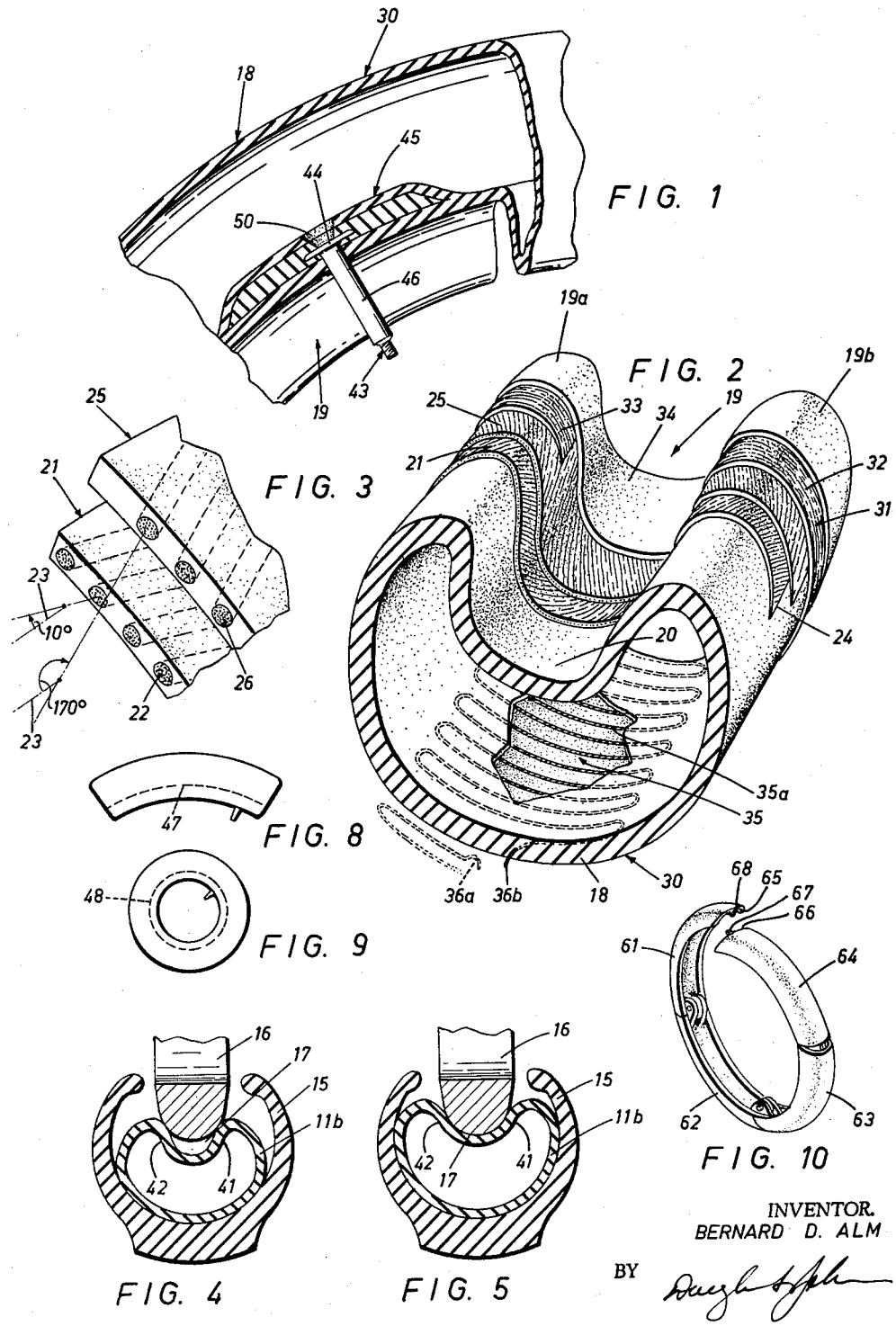

Inventor
BERNARD D. ALM
by: *[signature]*
Attorney

United States Patent Office 3,187,384
Patented June 8, 1965

3,187,384
CURING TUBES FOR VULCANIZING APPARATUS
Bernard Douglas Alm, 95 Research Road, Toronto 16, Ontario, Canada
Filed Nov. 17, 1961, Ser. No. 153,019
11 Claims. (Cl. 18—45)

This invention relates to improvements in inflatable members, particularly for use as a curing tube or bag in tire retreading equipment or the like.

The principal object of this invention is to provide a curing tube which will have a much longer life under the conditions encountered in vulcanizing operations.

It is an object of this invention to provide a thin-walled tube construction which enlarges in a controlled predetermined manner to a shape intimately conformable to the outline of the interior of the tire casing substantially throughout its extent, without appreciable stretching of the material of the walls of the tube.

More particularly, it is desired to provide a tube which experiences the greatest displacement in those regions not subject to the direct application of heat and also to maintain a high degree of flexibility as well as strength in the latter-mentioned regions.

Another very important object is to provide a curing tube into which a resistance element can be incorporated to generate heat within the tire casing and particularly in the region of the tread of the casing.

Still another object is to provide a substantially non-stretchable yet expansible tube which can be used with a much-simplified collapsible rim formation.

Another object is to provide a curing tube which is able to accommodate tire casings over a determined range of sizes and also a tube which has a great measure of flexibility throughout, obviating to a great extent the abuse incident upon insertion in and withdrawal of the tube from the casing.

Still another very important object is to provide a tube of relatively simple construction and of economical manufacture which, taken in conjunction with the long life expectancy of the tube, contributes to the efficiency of re-treading vulcanizing operations.

The principal feature of this invention resides in providing a tubular inflatable article of vulcanized rubber or like substance which is both flexible and expansible, and having a relatively thin bounding wall of substantially uniform thickness throughout, the wall being reinforced throughout by a fabric envelope including a layer or layers of material having uni-directional reinforcing cords to control the stretching of the wall in pre-determined directions in those areas which are subject to heating and extreme flexing to avoid deterioration, the tubular inflatable article having a re-entrant fold extending longitudinally thereof such that upon inflation, cross-sectional expansion is accomplished, principally by the unfolding action of the re-entrant fold.

More particularly, the tubular inflatable article has a pre-formed re-entrant wall portion including a pair of folded wall portions arranged in side-by-side relation and joined by an intermediate wall portion depressed in relation to the folded wall portions, there being applied over the region of said re-entrant fold a first layer of fabric consisting of uni-directional substantially non-extensible cords embedded in vulcanized rubber or the like, arranged to extend at an acute angle to the cross-sectional plane of the tubular inflatable article and a second layer of fabric consisting of uni-directional substantially non-extensible cords embedded in vulcanized rubber or the like overlying said first-mentioned layer and arranged at an obtuse angle measured from the aforementioned cross-sectional plane in the same direction as the aforesaid acute angle, this arrangement producing under inflation a scissors-like constraint both in cross-section and longitudinally inhibiting the extension of the flexible expansible material of the tubular inflatable member, yet permitting the folded wall portion to unfold and collapse upon inflation, thereby making available additional extent of bounding wall to conform to the interior wall of the casing.

Another feature resides in enveloping the remaining exposed area of the inflatable article in a fabric consisting substantially of non-extensible uni-directional cords, which cords are arranged to substantially coincide with a cross-section of the article, that is lying generally on the radius of the centre of curvature of the tube such that upon expansion there is a limited amount of circumferential stretching especially in that area lying next adjacent the bottom of the tire casing which is subjected to the greatest temperature and at the same time, controlling the stretching of the flexible expansible material in cross-section to such an extent that it is unappreciable.

By reason of the latter-mentioned construction, that is, the limited stretching cross-sectionally and the control of the extension circumferentially, there can be incorporated into the area of the tube next adjacent the bottom of the tire casing an extended length of resistance element folded upon itself, the folded lengths being arranged to extend in a direction parallel to the aforementioned cords of the enveloping fabric, with the linear portions of the resistance element in side-by-side relation and extending over a determined axial extent of the tube, which, because of the limitations of expansion, will not be ruptured and can be used to generate the necessary heat from within the casing to bring those areas of the casing up to the desired vulcanizing temperature.

Another feature resides in providing a novel collapsible rim formation of a size and configuration to fit within the re-entrant fold of the inflatable tube, the collapsible rim constraining the inflatable tube to expand in a predetermined manner under inflation to bear against the inner surfaces of the tire casing.

It is a feature of this invention also to employ nylon cord material in the layered fabrics, nylon cord having been found to have characteristics substantially unaffected by the temperature and pressure considerations over the life of the tube and to use butyl rubber as the material both for the tube wall and for the embedding of the nylon cord in the layered material.

These and other objects and features will be found in the following specification to be read in conjunction with the sheets of drawings in which:

FIGURE 1 is a view of a portion of a curing tube with a wall broken away to reveal the general structure of the tube and the manner in which the valve device is incorporated into the wall of the tube;

FIGURE 2 is a perspective view of a section of the curing tube with portions of the applied layers removed to reveal their disposition and the relationships to the bounding wall and to each other;

FIGURE 3 is an enlarged perspective view of a portion of the fabric layers overlying the re-entrant fold of the curing tube of FIGURE 2;

FIGURES 4 and 5 are diagrammatical mid-sectional views of a tire casing, a curing tube constructed in accordance with the invention, and a novel collapsible rim formation to illustrate the action of the curing tube under inflation;

Figure 6:
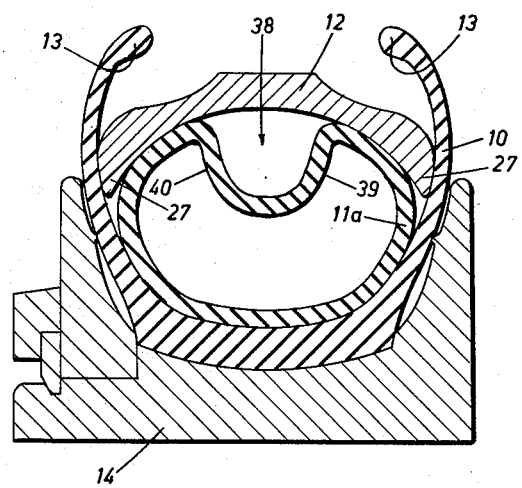
Figure 7:
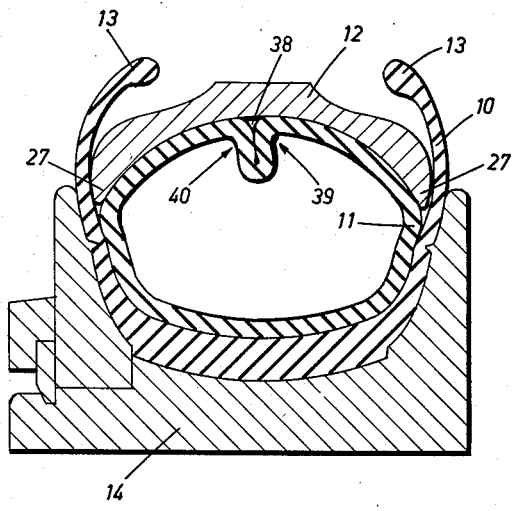

FIGURES 6 and 7 of the drawings are diagrammatical mid-sectional views of a tire casing, a curing bag and a conventional collapsible rim formation, all of which are located within a mold, to illustrate the action of the curing tube under inflation;

FIGURE 8 is a diagrammatic illustration of a section of a bag embodying the invention;

FIGURE 9 is a curing tube having a generally toroidal configuration under inflation;

FIGURE 10 is a perspective view of still another embodiment of collapsible rim formation useful with the curing bag of FIGURE 2.

In FIGURES 6 and 7 of the drawings, a tire casing 10 is illustrated with a curing tube 11a embodying the invention therein. A conventional collapsible rim construction 12 overlies the tube 11, with the edges of the rim registering beneath the beads 13 of the tire casing 10 to hold the inflatable curing tube 11a against escape upon the application of air pressure or other suitable fluid pressure to the tube.

The casing 10 is shown within a conventional mold indicated at 14, the details of which do not form any part of the invention.

In FIGURES 4 and 5 of the drawings, a tire casing 15 is illustrated with a curing tube 11b embodying the invention therein, the casing being provided with a novel collapsible rim construction 16 having a configuration to fit within the U-shaped re-entrant fold 17 of the tube 11, the rim 16 controlling inflation such that the outer bounding surface of the tube 11 is constrained to bear against the inner surface of the tire casing 15 in a manner similar to that illustrated in FIGURES 6 and 7.

A section of the curing tubes 11a, 11b of FIGURES 4 through 7 is illustrated in detail in FIGURES 1 and 2. Tubes 11a and 11b have an identical construction and consist of a principal bounding wall 18 preferably of butyl rubber which is resistant to deterioration under heat and particularly over the range of temperatures encountered in retreading operations. Butyl rubber is not subject to cracking which is normally experienced with crude rubber.

Wall 18 has a substantially uniform thickness throughout its extent (see FIGURE 2) and is provided with an integral longitudinally extending re-entrant fold formation 19.

The wall 18 of butyl rubber is relatively thin, in practice of the order of $5/16''$, which thinness makes the tube very flexible and very easily handled when it is being inserted in or withdrawn from a tire casing.

It is to be observed that the changes in the contour of the tube wall 18 are uniform without any sharp ridges or corners and that thick, stiff shoulder portions are avoided in those regions where cracking would be expected to occur.

As best seen in FIGURE 2 the fold formation 19 is defined by two folds 19a and 19b at either side of an intermediate depressed wall portion 20.

Overlying the depressed wall portion 20 and the surface of the folds 19a and 19b is a first fabric length 21 cut on the bias and of unidirectional nylon cord preferably embedded in a layer of vulcanized rubber or any other suitable material, the cords 22 thereof extending generally transversely of the tube and forming an angle of the order of 10° to a cross-sectional plane indicated at 23.

In the case of an endless tube such as that illustrated in FIGURE 9, the fabric 21 extends substantially throughout the inner circumference thereof and to a point 24 beyond the apices of the folds 19a, 19b midway down the outer surface.

Overlying the fabric layer 21 is a second fabric layer 25 of unidirectional nylon cord cut on the bias and embedded in a suitable vulcanized rubber layer. The unidirectional cords 26 thereof extend generally diagonally of the cords 22 of fabric layer 21 and form an obtuse angle of the order of 170° with the aforementioned cross-sectional plane indicated at 23 measured in the same direction as the acute angle of cords 22.

In this region it is important to prevent pinching of the tube 11 with conventional collapsible rim formations as will be appreciated from FIGURES 6 and 7, in that the edges 27 of the rim formation 12 bear against the outer surfaces of folds 19a, 19b, and tend to crease and pinch the wall of the tube 11 against the tire casing walls.

The diagonal disposition of cords 21 and 26 reinforces the tube against stretching in that region and inhibits the tendency of the wall to be displaced under the application of pressure internally so that pinching of the tube is obviated.

Overlying the main contact portion 30 of tube 11 is a fabric envelope 31 lapping the layers 21 and 25 as at 33 consisting of unidirectional nylon cords 32 embedded in a layer of vulcanized rubber and arranged to lie in a cross-sectional plane so that the wall 18 is constrained against stretching in cross-section but the main contact portion 30 is expansible circumferentially to a limited degree to facilitate enlargement circumferentially.

A skin of rubber 34 overlies the entire surface of the tube 11.

Where it is desired, there can be incorporated into the main contact portion 30 of the tube 11 an extended length of resistance element indicated at 35, the resistance element 35 being folded upon itself in the manner shown in FIGURE 2 to dispose suitably insulated sections 35a thereof in side-by-side relation, each section extending generally in a radial plane, with reference to the centre of curvature of the tubular inflatable member.

In the preferred embodiment the resistance element is in the form of 8 strands of pure nickel wire #30.

Also terminals 36a, 36b are provided which project from the wall of the tube for connection to a source of electricity.

Because of the control of the stretching of the bounding wall of the tube radially, it will be appreciated that there is little tendency to rupture or break the resistance element under inflation and also because of the folding of the resistance element transversely under the limited expansion circumferentially, the side-by-side sections 35a of the resistance element can separate.

With this construction it is possible to provide a curing tube with integral means for supplying heat to those areas of the tire casing which require heat to successfully carry out the vulcanizing operation.

It is emphasized that by limiting stretching of the rubber wall 18 of the tube deterioration is inhibited but also it is important to have conformability of the tube to the interior of the tire casing.

In FIGURE 6, the tube 11a is shown inflated and disposed within the tire casing 10 with a rigid section of the collapsible rim 12 overlying the region of the re-entrant fold 38.

Upon the application of fluid pressure to the tube 11a the re-entrant fold 38 collapses upwardly as illustrated in FIGURE 7, thereby making available an extent of the opposed walls 39, 40 of the re-entrant fold for conforming to the cavity defined by the casing 10 and the rim 12 resulting in the application of pressure to the casing wall.

It is to be appreciated that the expansible material of the wall, while constrained cross-sectionally, can extend to a limited degree circumferentially, this action coupled with the collapsing action of the re-entrant fold assuring conformability and uniform application of pressure to the tire casing which, it will be readily appreciated, can be achieved over a range of tire casing sizes.

In FIGURES 4 and 5 an improved rim construction is employed in conjunction with the curing tube 11b. It is seen in these figures that the rim 16 presents a U-shaped wall to the re-entrant fold 17, which wall limits the collapse of the re-entrant fold upwardly under the application of fluid pressure.

Because of the restraint offered by the rim 16, the application of pressure to the tube 11b results in the displacement of the regions 41a and 42, respectively, outwardly and upwardly against the tire casing wall and so provide the requisite conformability and pressure for vulcanizing.

In FIGURE 10 a collapsible rim of U-shaped cross section is illustrated consisting of hinged sections 61, 62, 63 and 64 of part circular configuration. The sections 61 and 64 are adapted to be releasable one from the other and define a joint whose abutting edges 65, 66, respectively, are on the bias with respect to the radial direction of the rim in annular form.

A suitable projection 67 is provided on the rim portion 64 which is adapted to releasably interlock with a catch 68 provided on the inner surface of the rim portion 61 at the biased ends.

It is to be appreciated that the collapsible rim of FIGURE 10 is assembled from within the tire casing in annular configuration that is required for co-operation with the curing tube of FIGURE 9.

In FIGURE 1 a section of the tube of FIGURES 4, 5, 6 and 7 is illustrated with the wall of the tube being broken away to reveal the structure adjacent the valve 43.

As will be seen in FIGURE 1, the base 44 of the valve, including a separate rubber section 45, is incorporated into the wall of the tube at the base of the re-entrant fold, the stem 46 of the valve projecting upwardly centrally of the re-entrant fold in a convenient position for connection with the source of fluid pressure.

FIGURE 8 is a representation of a section bag embodying the invention, the re-entrant fold being indicated at 47. The section bag is used for minor repairs to tire casings.

FIGURE 9 illustrates a curing tube employed in tire retreading operations and having a generally toroidal configuration under inflation with a re-entrant fold 48 extending throughout the inner circumference thereof.

The manufacture of the tube illustrated in FIGURE 9 will now be described.

The tube in the first stage of its manufacture is provided in a straight length of rubber tube, butyl rubber preferably. The rubber tube is uncured.

The rubber tube is first cut into appropriate lengths for the formation of the endless tube of FIGURE 9. Excessive soapstone is cleaned from the interior and exterior by the application of a jet of compressed air.

The open ends of the tube length are then prepared for a scarf joint which consists of approximately a 1″ deep scarf on each end of the tubular length to effect a telescopic joint.

A valve hole 50 (see FIGURE 1) is punched through the tube wall at a distance of approximately 6″ from one end, and the area immediately surrounding the valve hole 50 is buffed clean of soapstone. The roughened surface produced has a suitable cement applied to it and as well, cement is applied over the area around it.

The base 44 of the valve stem 46 is also buffed preparatory to receiving the cement.

After a waiting period for the cement to become tacky, the valve stem is placed in the position above the valve hole, and the rubber section 45 is cemented in position above the base 44.

The outside of the tube is thoroughly cleaned with a rubber solvent to exclude all traces of soapstone, the rubber solvent leaving a tacky surface. The strips 21 and 25 of fabric are prepared by cutting from a fabric sheet on the bias of approximately 10° and are applied to the tube between the valve 43 and the ends of the tube.

The first strip 21 is applied to the tacky top surface of the tube which will subsequently comprise the inner circumference of the tube when formed.

Solvent is then applied over the first fabric layer 21 to render its surface tacky, and the second layer 25 is then applied thereover, both being thoroughly stitched down over the flat surface of the tubular length and around the edges thereof.

The tube is then turned over with the valve facing down and the strip 31 applied over the lower side. Rubber solvent is used to render the surface of the tube tacky for receiving the strip 31.

A sufficient time is allowed following the application of solvent for all gases to evaporate.

Cement is then applied to the scarfed ends of the tube and the telescopic joint made between the ends, which is subsequently thoroughly stitched down to ensure complete contact.

To the area surrounding the valve and the scarf joint a set of strips of tire cord are applied and arranged to overlap the previously applied covering in a manner such that the overlap does not occur uniformly.

The tube is then allowed to stand for a period of approximately 12 hours prior to curing.

The enveloped rubber tube while still flat in section is placed in a cold curing mold which is closed and a pressure of 100 lbs. per square inch applied.

Steam heat at the temperature of the order of 300° F. is then applied and the tube is allowed to cure for a period of one hour.

At the elapse of the hour period the tube is removed from the mold having the external configuration of the tube illustrated in FIGURE 9 with the re-entrant fold therein as indicated in FIGURE 2, excess rubber overflow being trimmed from the tube which is then tested for leakage and any other visible defects.

While the preferred embodiments of the invention have been herein described and illustrated, it will be understood that various modifications and alterations may be made by persons skilled in the art without departing from the spirit of the invention or scope of the appended claims.

What I claim is:

1. An inflatable article of generally tubular configuration having a bounding wall of flexible expansible material, said tubular inflatable article having a pre-formed re-entrant wall portion extending substantially throughout the axial extent of same and including a pair of folded wall portions arranged in side-by-side relation and joined by an intermediate wall portion depressed in relation to said folded wall portions, first flexible substantially non-extensible means incorporated into said bounding wall in the region of said pair of folded wall portions and intermediate wall portion constraining same against stretching both axially of said tubular inflatable article and cross-sectionally thereof under inflation, but leaving same free for unfolding under inflation, and second flexible substantially non-extensible means incorporated into the remaining bounding wall of said tubular inflatable article constraining same against stretching substantially solely cross-sectionally under inflation but leaving same free for circumferential extension under inflation.

2. An inflatable article according to claim 1 in which a length of flexible heat-generating resistance element is incorporated into that wall portion of said tubular inflatable member constrained solely against cross-sectional stretching by said second substantially non-extensible means, said resistance element being folded upon itself to present linear portions arranged to lie substantially only in a cross-sectional plane with the linear portions in side-by-side relation and extending over a limited circumferential extent of said tubular inflatable member, said resistance element having terminal portions projecting without said latter-mentioned wall portion for connection to a source of electrical potential.

3. An inflatable article according to claim 2 wherein said first substantially non-extensible means comprises a first layer of fabric consisting of unidirectional substantially non-extensible cords incorporated into and extending over the region of said bounding wall having said re-entrant fold therein, the cords of said fabric being arranged to extend at an acute angle to the cross-sectional plane of said tubular inflatable article and a second layer of fabric consisting of uni-directional substantially non-extensible cords overlying said first layer with the cords of said second layer being arranged to extend at an obtuse angle with reference to the cross-sectional plane aforementioned said latter cords intersecting with the first-mentioned cords of said first layer and said second non-extensible means comprises a layer of fabric consisting of uni-directional substantially non-extensible cords enclosing the remaining bounding wall of said inflatable article and lapping said first-mentioned layers, said latter-mentioned cords being arranged to lie in a cross-sectional plane of said tubular inflatable article and leaving the flexible extensible material of said wall free for circumferential extension under inflation.

4. An inflatable article according to claim 3 in which the acute angle of the uni-directional cords of said first layer is of the order of 10° and the obtuse angle of said cords of said second layer overlying said first layer is of the order of 170°.

5. An inflatable article according to claim 4 wherein said bounding wall is of vulcanized butyl rubber.

6. An inflatable article according to claim 5 wherein said cords of said fabric layers are of nylon embedded in a matrix vulcanized to said butyl rubber.

7. An inflatable article according to claim 6 wherein said matrix is one of natural and butyl rubber.

8. An inflatable article for disposition within a tire casing in tire repair operations or the like comprising an endless tubular inflatable member of flexible expansible material having a generally toroidal shape under inflation, the wall portion thereof bounding the inner periphery thereof having a re-entrant fold formation therein extending radially outwardly of and circumferentially around the inner periphery, first substantially non-extensible means incorporated into the flexible expansible material of said bounding wall portion having said re-entrant fold therein constraining same against circumferential extension and cross-sectional extension under inflation but leaving same free for unfolding action under inflation, and second substantially non-extensible means incorporated into the flexible expansible material of the remaining bounding wall of said inflatable member constraining same substantially solely against cross-sectional extension but leaving the material free for limited circumferential extension under inflation.

9. An inflatable article for disposition within a tire casing in tire repair operations or the like comprising an endless tubular inflatable member of flexible expansible material having a generally toroidal shape under inflation, the wall portion thereof bounding the inner periphery thereof having a re-entrant fold formation therein extending radially outwardly of and circumferentially around the inner periphery, and including a pair of folded wall portions arranged in side-by-side relation joined by an intermediate wall portion depressed in relation to said folding wall portions, a first flexible substantially non-extensible fabric layer incorporated into the bounding wall in the region of said pair of folded wall portions and intermediate wall portion constraining same against stretching both circumferentially of said tubular inflatable article and cross-sectionally under inflation but leaving same free for unfolding action under inflation and second flexible substantially non-extensible fabric layer having non-extensible cords lying in one direction only and incorporated into the remaining bounding wall of said tubular inflatable article with said latter-mentioned cords arranged to lie in a plane extending generally radially of said inflatable member and being adapted to constrain same against stretching substantially solely cross-sectionally under inflation but leaving the expansible material of said wall portion free for circumferential extension under inflation.

10. In tire retreading apparatus, the combination of an inflatable curing tube for disposition within a tire casing, said curing tube comprising an endless tubular inflatable member of flexible expansible material having a generally toroidal shape under inflation, the wall portion thereof bounding the inner periphery thereof having a re-entrant fold formation therein extending radially outwardly of and circumferentially around the inner periphery, first substantially non-extensible means incorporated into the flexible expansible material of said bounding wall portion having said re-entrant fold therein constraining same against circumferential extension and cross-sectional extension under inflation but leaving same free for unfolding action under inflation, and second substantially non-extensible means incorporated into the flexible expansible material of the remaining bounding wall of said inflatable member constraining same substantially solely against cross-sectional extension but leaving the material free for limited circumferential extension under inflation, and an endless rim formation having a rigid circular outline of a diameter of the order of the inner diameter of said inflatable member, said rim formation being arranged inwardly of said inflatable member and spaced apart from said tire casing, said rim formation including a circumferentially extending wall of U-shaped configuration in cross-section to the re-entrant fold thereof, said latter wall constituting a surface of abutment against which said re-entrant fold is conformed under inflation, said rim formation constraining said re-entrant fold to unfold in a pre-determined manner and direction to urge the remaining bounding wall into conformity with the inner wall of a tire casing.

11. The combination of claim 10 in which the rim formation comprises a plurality of part circular sections hinged together, with two of said adjacent sections being releasably secured together, said part circular sections assuming upon full displacement outwardly, a circular configuration of a diameter to register with the re-entrant fold of said endless tubular inflatable member, said rim formation being collapsible and erectable within the tubular inflatable member.

References Cited by the Examiner

UNITED STATES PATENTS

| 1,327,264 | 1/20 | Alsten | 18—45 |
| 1,620,435 | 3/27 | Burdette | 18—45 |
| 2,312,587 | 3/43 | Price | 25—128 |
| 2,582,715 | 1/52 | Murray | 18—45 |
| 2,586,526 | 2/52 | Enabnit | 18—45 |
| 2,810,931 | 10/57 | Wolfe | 18—45 |
| 2,848,745 | 8/58 | Morris | 18—45 |

FOREIGN PATENTS

| 547,227 | 9/22 | France. |
| 609,209 | 9/48 | Great Britain. |

MICHAEL V. BRINDISI, *Primary Examiner.*